United States Patent Office 3,577,284
Patented May 4, 1971

3,577,284
ACTIVATED FLUX
Alvin Schneider, Edison, and Joseph Tarnowsky, Teaneck, N.J., assignors to Alpha Metals, Inc., Jersey City, N.J.
No Drawing. Filed Apr. 7, 1969, Ser. No. 822,821
Int. Cl. C23c 1/12
U.S. Cl. 148—23
28 Claims

ABSTRACT OF THE DISCLOSURE

A flux for low melting point alloys composed of a fluxing agent and an activating agent of a phenacyl halide or a derivative thereof, which does not exceed safe limits for corrosion and electrical properties.

FIELD OF THE INVENTION

This invention relates generally to solder fluxes, and particularly to activated solder fluxes which leave no residues that corrode or reduce dielectric strength.

DESCRIPTION OF PRIOR ART

Water white rosin is used as a flux and has excellent dielectric strength. However, it does not have superior fluxing properties. In order to improve the fluxing qualities, activators are added. A fully activated flux may be prepared by adding ½% by weight of an amine hydrohalide to the rosin. The fully activated flux forms an immediate good quality joint, but is characterized by sporadic low dielectric strength arising from the degree of moisture in the air combining with ionic material in the flux residue. Arcing may result, so that there is a necessity for washing off the flux residue of the fully activated flux. In addition to arcing, there is the probability of corrosion by the flux residue.

To avoid the problems arising from the fully activated flux, mild activators have been tried in the hope that the residue would not be corrosive, the joint would be strong, and the dielectric strength of the product would be excellent under all conditions of temperature and humidity. Mild activators have been utilized, but they only accomplish poor fluxing qualities, so that the joints formed are weak, and there are numerous rejects. Only if the joint to be soldered is entirely free of tarnish, will a strong joint be attained, and even then, the dielectric strength is poor under conditions of high humidity, and the risk of corrosion is ever present.

Whether the flux is normal, mildly activated, or highly activated, it must be provided in several forms for various types of operations: liquid flux, foam flux, or cored solder flux. Because of the inherent problems arising from the use of normal fluxes, mildly activated fluxes, and highly activated fluxes, and the fact that gum rosin displays to a lesser extent, the defects arising from the use of other natural or synthetic resinous material, prevailing government standards have imposed upon industry the use of gum rosin in fluxes.

An ideal flux would be one which utilized either natural or synthetic resins, that had excellent heat stability, that formed an excellent joint, that had excellent dielectric strength under most conditions of heat and humidity, did not leave a corrosive residue, and could be embodied in either liquid, foam or cored solder form.

SUMMARY OF INVENTION

In the pursuit of the activated flux composition, it was found that certain acetophenone derivatives perform as addition agents for fluxing materials to activate them highly, form strong joints, leave no residues to corrode, or reduce the dielectric strength under conditions of humidity.

These materials decompose to near soldering temperature to liberate halides. Examples of these acetophenone derivatives serving as activators are:

(1) phenacyl chloride (2-chloro-acetophenone)
(2) phenacyl bromide (2-bromo-acetophenone)
(3) p-bromophenacyl bromide (2,4'-dibromo-acetophenone)

Phenacyl chloride is a highly toxic lachrymatory agent, having severe and prolonged effects, so that it can only be used under conditions of isolation from the operator. Phenacyl bromide is less toxic. p-Bromophenacyl bromide is non-toxic.

The activated flux composition can be embodied in any of the types of fluxes.

EXAMPLE I—LIQUID FLUX

Approx. percent by wt.

Flux: water white gum rosin _____ 37
Activator: any as specified supra _____ 1
Vehicle: isopropyl alcohol _____ 62

EXAMPLE II—FOAM FLUX

Flux: water white gum rosin _____ 37
Activator: any as specified supra _____ 1
Vehicle: denatured ethanol _____ 52
Foamer: hexylene glycol _____ 10

EXAMPLE III—CORED SOLDER

Solder: tubular wire filled with flux and activator
Flux: solid water white gum rosin
Activator: any as specified supra These activated fluxes rapidly form strong soldered joints with dielectric strength and freedom from corrosion well within accepted standards.

Other phenacyl halides are good flux activators and may be substituted for the acetophenone derivatives first mentioned with very satisfactory results:

(4) 2-bromo-4' phenacyl acetophenone
(5) 2-bromo-4' nitroacetophenone
(6) 2-bromo-2' acetonaphthone
(7) 2-bromo-2-phenylacetophenone
(8) 2-chloro-4'-phenylacetophenone
(9) 3-chloropropiophenone
(10) 2-bromo-m-methoxyacetophenone These seven derivatives have the virtue of being free of lachrymatory properties.

Another group of phenacyl halides are good activators, but are active lachrymatory agents:

(11) 2-bromo-4'-chloroacetophenone
(12) 2-bromopropiophenone

Still another group of phenacyl halides are less satisfactory as activators but have no lachrymatory activity:

(13) 4'-bromoacetophenone
(14) 2-chloro-3',4'-dihydroxyacetophenone
(15) 2,2,4'-tribromoacetophenone
(16) 2-bromo-2',5'-dimethoxyacetophenone
(17) 2-bromoisobutyrophenone
(18) 2-bromo-o-methoxyacetophenone
(19) 2-chloro-p-hydroxyacetophenone In the following group of phenacyl halides, in addition to being less satisfactory flux activating qualities, there are prominent lachrymatory characteristics:

(20) 4'-chloroacetophenone
(21) 2-chloro-2',4'-dimethylacetophenone
(22) 2-bromo-4'-fluoroacetophenone
(23) 2-bromo-p-methoxyacetophenone
(24) 2,2-dichloroacetophenone Excellent to good solder spread results are achieved in tests of the activators numbered 1 to 12.

Fair to poor solder spread results are achieved in tests of the activators numbered 13 to 24.

Lachrymatory properties are absent from activators numbered 3 to 10 and 13 to 19, while 1, 2, 11, 12 and 20 to 24 are lachrymators.

The foregoing phenacyl halides numbered 1 to 24 are considered to be illustrative and representative of phenacyl halides as a generic class and are not intended as limitations on the class.

What is claimed:

1. An activated flux comprising
   (a) a fluxing agent,
   (b) an activator mixed with the fluxing agent,
   (c) the activator being a phenacyl halide.
2. An activated flux according to claim 1 in which the fluxing agent is a natural resin.
3. An activated flux according to claim 1 in which the fluxing agent is a synthetic resin.
4. An activated flux according to claim 1 in which the fluxing agent is water white rosin.
5. An activated flux according to claim 1 in which the phenacyl halide is 2-chloro-acetophenone.
6. An activated flux according to claim 1 in which the phenacyl halide is 2-bromo-acetophenone.
7. An activated flux according to claim 1 in which the phenacyl halide is 2,4'-dibromo-acetophenone.
8. An activated flux according to claim 1 in which the phenacyl halide is 2-bromo-4'-phenacyl acetophenone.
9. An activated flux according to claim 1 in which the phenacyl halide is 2-bromo-4'-nitroacetophenone.
10. An activated flux according to claim 1 in which the phenacyl halide is 2-bromo-2'-acetonaphthone.
11. An activated flux according to claim 1 in which the phenacyl halide is 2-bromo-2-phenylacetophenone.
12. An activated flux according to claim 1 in which the phenacyl halide is 2-chloro-4'-phenylacetophenone.
13. An activated flux according to claim 1 in which the phenacyl halide is 3-chloropropiophenone.
14. An activated flux according to claim 1 in which the phenacyl halide is 2-bromo-m-methoxyacetophenone.
15. An activated flux according to claim 1 in which the phenacyl halide is 2-bromo-4'-chloroacetophenone.
16. An activated flux according to claim 1 in which the phenacyl halide is 2-bromopropiophenone.
17. An activated flux according to claim 1 in which the phenacyl halide is 4'-bromoacetophenone.
18. An activated flux according to claim 1 in which the phenacyl halide is 2-chloro-3',4'-dihydroxyacetophenone.
19. An activated flux according to claim 1 in which the phenacyl halide is 2,2,4'-tribromoacetophenone.
20. An activated flux according to claim 1 in which the phenacyl halide is 2-bromo-2',5'-dimethoxyacetophenone.
21. An activated flux according to claim 1 in which the phenacyl halide is 2-bromoisobutyrophenone.
22. An activated flux according to claim 1 in which the phenacyl halide is 2-bromo-o-methoxyacetophenone.
23. An activated flux according to claim 1 in which the phenacyl halide is 2-chloro-p-hydroxyacetophenone.
24. An activated flux according to claim 1 in which the phenacyl halide is 4'-chloroacetophenone.
25. An activated flux according to claim 1 in which the phenacyl halide is 2-chloro-2',4'-dimethylacetophenone.
26. An activated flux according to claim 1 in which the phenacyl halide is 2-bromo-4'-fluoroacetophenone.
27. An activated flux according to claim 1 in which the phenacyl halide is 2-bromo-p-methoxyacetophenone.
28. An activated flux according to claim 1 in which the phenacyl halide is 2,2-dichloroacetophenone.

References Cited

UNITED STATES PATENTS

| | | | |
|---|---|---|---|
| 3,086,893 | 4/1963 | Konig | 148—23 |
| 3,127,290 | 3/1964 | Konig | 148—23 |

DELBERT E. GANTZ, Primary Examiner

G. E. SCHMITKONS, Assistant Examiner

U.S. Cl. X.R.

148—25